US009297490B2

(12) United States Patent
Nooren

(10) Patent No.: US 9,297,490 B2
(45) Date of Patent: Mar. 29, 2016

(54) PROCESS FOR PROVIDING AN EXTENDED TUBULAR ARTICLE WITH A CORROSION PROTECTION COATING SYSTEM HAVING SELF-REPAIRING PROPERTIES

(71) Applicant: Frans Nooren Afdichtingssystemen B.V., Stadskanaal (NL)

(72) Inventor: Frans Nooren, Stadskanaal (NL)

(73) Assignee: Frans Nooren Afdichtingssystemen B.V., Stadskanaal (NL)

( * ) Notice: Subject to any disclaimer, the term of this patent is extended or adjusted under 35 U.S.C. 154(b) by 0 days.

(21) Appl. No.: 14/222,038

(22) Filed: Mar. 21, 2014

(65) Prior Publication Data
US 2014/0318686 A1 Oct. 30, 2014

Related U.S. Application Data

(63) Continuation of application No. 12/513,984, filed as application No. PCT/NL2007/050542 on Nov. 7, 2007, now abandoned.

(60) Provisional application No. 60/864,910, filed on Nov. 8, 2006.

(30) Foreign Application Priority Data

Nov. 8, 2006 (EP) ..................................... 06123683

(51) Int. Cl.
F16L 58/10 (2006.01)
B32B 1/08 (2006.01)
B32B 7/12 (2006.01)
B32B 15/08 (2006.01)
B32B 27/32 (2006.01)
C09D 123/20 (2006.01)

(52) U.S. Cl.
CPC . F16L 58/10 (2013.01); B32B 1/08 (2013.01); B32B 7/12 (2013.01); B32B 15/08 (2013.01); B32B 27/32 (2013.01); C09D 123/20 (2013.01); C08L 2205/02 (2013.01)

(58) Field of Classification Search
CPC ...................................................... F16L 58/10
USPC .................................... 156/86, 334, 330, 184
See application file for complete search history.

(56) References Cited

U.S. PATENT DOCUMENTS

| 4,070,746 A | 1/1978 | Evans et al. |
| 4,268,334 A | 5/1981 | Harris et al. |
| 4,287,034 A | 9/1981 | Pieslak et al. |
| 4,472,468 A | 9/1984 | Tailor et al. |
| 4,497,926 A | 2/1985 | Toy |
| 4,558,875 A | 12/1985 | Yamaji et al. |
| 4,690,958 A | 9/1987 | Lacoste et al. |
| 4,713,133 A | 12/1987 | Kent |
| 4,732,412 A | 3/1988 | Van Der Linden et al. |
| 4,892,410 A | 1/1990 | Snow et al. |
| 5,049,005 A | 9/1991 | Lazare et al. |
| 5,226,751 A | 7/1993 | Doleshal |
| 5,348,801 A | 9/1994 | Venzi et al. |
| 5,362,572 A | 11/1994 | Hamada et al. |
| 5,445,848 A | 8/1995 | Venzi et al. |
| 5,462,780 A | 10/1995 | Richards |
| 5,464,886 A | 11/1995 | Tran et al. |
| 5,591,265 A | 1/1997 | Tusch |
| 5,621,025 A | 4/1997 | Toerner et al. |
| 5,663,230 A | 9/1997 | Haman |
| 5,817,413 A | 10/1998 | Huddleston et al. |
| 5,898,044 A * | 4/1999 | Nooren .......................... 428/323 |
| 6,033,776 A | 3/2000 | Huddleston et al. |
| 6,172,014 B1 | 1/2001 | Meyers |
| 6,274,235 B1 | 8/2001 | Ichimura et al. |
| 6,297,324 B1 | 10/2001 | Briddell et al. |
| 6,326,421 B1 | 12/2001 | Lipman |
| 6,355,318 B1 | 3/2002 | Tailor et al. |

(Continued)

FOREIGN PATENT DOCUMENTS

CA 2 308 802 A1 11/2001
CN 1749343 3/2006

(Continued)

OTHER PUBLICATIONS

"Adhesives and Sealants in Buildings," Building Research Institute, Pub. 577, Wash. D.C. 1958, pp. 14-18, 23-26, and 78-82.
BASF Technical Information sheet, "Oppanol B types—Oppanol B 10 SFN, Oppanol B 11 SFN, Oppanol B 12 SFN, Oppanol B 13 SFN, Oppanol B 15 SFN" edit. TI/ES 1482 us, Sep. 2003, pp. 1-8.
BASF Technical Information sheet, "Oppanol B types—Oppanol B 30 SF, Oppanol B 50 / B 50 SF, Oppanol B 80," edit. TI/ES 1415 us, Apr. 2003, pp. 1-11.
BASF Technical Information sheet, "Permanently Plastic Sealants based on Oppanol B," May 1974, 3 pages.
BASF Technical Information, TI/ES 1417 us Apr. 2003, pp. 1-10.
Belkin et al., "Plastics in Armor Materiel," US Army Foreign Science and Technology Center, FSTC-HT-23-1105-71, 5 pages.
BP Indopol Polybutenes—Delivering Value Through Versatility, 30 pages.

(Continued)

Primary Examiner — Daniel Lee
(74) Attorney, Agent, or Firm — Foley & Lardner LLP; Sunit Talapatra

(57) ABSTRACT

The present invention relates to a process for providing an extended tubular article or one or more sections of the extended tubular article with a corrosion protecting system, wherein (a) a layer of an adhesive composition is applied to the surface of the extended tubular article or the one or more sections of the extended tubular article, and (b) a corrosion protecting layer is applied to the layer of the adhesive composition, the adhesive composition comprising a polyolefin blend, wherein the polyolefin blend comprises 30% to 100% by weight of a polyisobutene and 0% to 70% by weight of an olefin polymer, based on the total weight of the polyolefin blend, wherein said polyisobutene is has a glass transition temperature of lower than −40° C. and a number average molecular weight $M_n$ of 1300 to 1.000.000.

29 Claims, No Drawings

(56) References Cited

U.S. PATENT DOCUMENTS

| | | |
|---|---|---|
| 6,465,547 B1 | 10/2002 | Jackson et al. |
| 6,569,915 B1 | 5/2003 | Jackson et al. |
| 6,569,927 B1 | 5/2003 | Gelbin |
| 6,589,346 B2 | 7/2003 | Schick et al. |
| 6,683,126 B2 | 1/2004 | Keller et al. |
| 6,794,453 B2 | 9/2004 | Jackson et al. |
| 6,930,151 B2 | 8/2005 | Kennedy et al. |
| 7,056,844 B2 | 6/2006 | Sheely |
| 7,361,384 B2 | 4/2008 | Mamish |
| 7,608,343 B2 | 10/2009 | Nooren |
| 7,887,825 B2 | 2/2011 | Weichold et al. |
| 7,887,925 B2 | 2/2011 | Nooren |
| 8,105,963 B2 | 1/2012 | Nooren |
| 2003/0114056 A1 | 6/2003 | Sheely |
| 2003/0195287 A1 | 10/2003 | Fisher |
| 2003/0198763 A1 | 10/2003 | Bicakci-Jenkins et al. |
| 2004/0028862 A1 | 2/2004 | Burwell et al. |
| 2004/0191515 A1* | 9/2004 | Mullen ......................... 428/404 |
| 2004/0266936 A1 | 12/2004 | Gipson |
| 2005/0043468 A1 | 2/2005 | Fisher |
| 2005/0234184 A1 | 10/2005 | Doring et al. |
| 2006/0175578 A1 | 8/2006 | Nooren |
| 2006/0182950 A1 | 8/2006 | Yun et al. |
| 2006/0201102 A1 | 9/2006 | Shah |
| 2010/0051199 A1 | 3/2010 | Nooren |

FOREIGN PATENT DOCUMENTS

| | | |
|---|---|---|
| DE | 21 00 478 | 11/1971 |
| DE | 201 19 209 U1 | 4/2002 |
| EP | 0 797 02 B1 | 5/1986 |
| EP | 0 232 936 A2 | 8/1987 |
| EP | 0 244 738 A2 | 11/1987 |
| EP | 0 574 060 | 12/1993 |
| EP | 0 826 817 | 3/1998 |
| EP | 1 086 953 B1 | 3/2001 |
| EP | 1 086 963 A | 3/2001 |
| EP | 0 751 198 B1 | 9/2004 |
| EP | 1 644 433 | 4/2006 |
| EP | 2 204 427 A1 | 7/2010 |
| JP | 54-120644 | 9/1979 |
| JP | 58-003827 | 1/1983 |
| JP | S 583827 | 1/1983 |
| JP | 09-221649 | 8/1997 |
| JP | H 09221649 | 8/1997 |
| SU | 747870 | 7/1980 |
| WO | WO-94/12581 A1 | 6/1994 |
| WO | WO 94/22598 | 10/1994 |
| WO | WO-95/24433 A1 | 9/1995 |
| WO | WO-96/28683 A1 | 9/1996 |
| WO | WO-99/14282 | 3/1999 |
| WO | WO-99/14282 A1 | 3/1999 |
| WO | WO-99/23186 | 5/1999 |
| WO | WO-99/23186 A1 | 5/1999 |
| WO | WO-99/48997 A1 | 9/1999 |
| WO | WO-99/56055 A1 | 11/1999 |
| WO | WO 00/52381 | 9/2000 |
| WO | WO-01/70869 A2 | 9/2001 |
| WO | WO-02/31038 A1 | 4/2002 |
| WO | WO-02/66551 A1 | 8/2002 |
| WO | WO-03/089537 | 10/2003 |
| WO | WO-03/089537 A1 | 10/2003 |
| WO | WO-2004/009654 A1 | 1/2004 |
| WO | WO-2004/072128 A1 | 8/2004 |
| WO | WO 2005/005528 A1 | 1/2005 |
| WO | WO-2006/045422 | 5/2006 |
| WO | WO-2006/045423 A1 | 5/2006 |
| WO | WO-2008/056979 A3 | 5/2008 |

OTHER PUBLICATIONS

English translation of A.A. Kardashow et al., "Synthetic Adhesives," Moscow 1968, pp. 284, 285 and 347-352.

EPA High Production Volume Program, (revised) Test Plan for IRGANOX 1330/ETHANOX 330, CAS No. 1709-70-2, Nov. 14, 2006, 6 pages.

Higgins et al., "Butyl Rubber and Polyisobutylene in Adhesives and Sealants," Reprint from *Handbook of Adhesives*, 3rd Ed., 1990, pp. 1-21.

International Search Report, PCT/NL2007/050542 dated Aug. 12, 2008, 3 pages.

Kessel, BASF News Release, PIBinside "Oppanol—Abandage against rust," Mar. 22, 2007, 3 pages.

Marsalko et al., "Just Add PIBs. Polyisobutylenes are a vital part of adhesive and sealant formulations," Adhesives & Sealants Industry (ASI), PIB Profile, As Seen in the May Issue, 4 pages.

Peyser, "Glass Transition Temperatures of Polymers," *Polymer Handbook*, 3rd ed., 1989, pp. VI/209, VI/214.

Product information for Ethanox® 702 Antioxidant, Albemarle Corporation, 2000, 2 pages.

Product information for Irganox® 1010 (Phenolic Primary Antioxidant for Processing and Long-Term Thermal Stabilization), Ciba Specialty Chemicals Inc., 1998, 2 pages.

Search Report mailed Oct. 18, 2010 in European Application No. 10155938.3 (EP 2210734); EP 2210734 is EP Div of EP 2081761 (corrs U.S. Appl. No. 12/513,984(US2010/0051199).

STOPAQ EUROPE—News, excerpt archived in 2007, 5 pages, http://web.archive.org/web/20070602031827/www.stopaq.com/en.

Wikipedia, "Glass transition," Sep. 12, 2010, 10 pages, found at http://en.wikipedia.org/wiki/Glass-transition.

Wikipedia, "Heat-shrink tubing," Sep. 12, 2010, 3 pages, found at http://en.wikipedia.org/wiki/Heat-shrink_tubing.

Willenbacher et al., "Polyisobutene-Based Pressure-Sentive Adhesives," *Handbook of Pressure-Sensitive Adhesives and Products*. 2003, pp. 4,1-4.2.

Wu, "Surface and Interfacial Tensions of Polymers, Oligomers, Plasticizers, and Organic Pigments," *Polymer Handbook*, 3rd ed., 1989, pp. VI 411-414.

Young et al "Polyisobutylene Tank Lining," Industrial and Engineering Chemistry, Jul. 1945, vol. 37, No. 7, pp. 675-678.

BASF Technical Information, "Oppanol B 100, Oppanol B 150, Oppanol B 200," edit. TI/ES 1417 us, Apr. 2003, pp. 1-10.

International Search Report of PCT/NL2013/050532 mailed Oct. 4, 2013.

International Search Report, PCT/NL2004/000510, dated Oct. 13, 2004.

\* cited by examiner

PROCESS FOR PROVIDING AN EXTENDED TUBULAR ARTICLE WITH A CORROSION PROTECTION COATING SYSTEM HAVING SELF-REPAIRING PROPERTIES

CROSS-REFERENCE TO RELATED APPLICATIONS

This application is a Continuation of U.S. application Ser. No. 12/513,984, filed Jul. 1, 2009 as the National Phase of International Patent Application No. PCT/NL2007/050542, filed Nov. 7, 2007, published as WO 2008/056979, which claims priority to European Application No. 06123683.2 and U.S. Provisional Application No. 60/864,910, both filed Nov. 8, 2006. The contents of these applications are herein incorporated by reference in their entirety.

FIELD OF THE INVENTION

The present invention relates to a process for providing a pipe, pipeline or a part thereof with a coating system having self-repairing properties to protect the pipe, pipeline or part thereof against corrosion and other harmful and degradative effects and forces induced by the environment that impart the lifetime and operation of the pipe, pipeline or part thereof.

BACKGROUND OF THE INVENTION

In the prior art many corrosion protective coating systems are disclosed and many of those corrosion protective coating systems are commercialised. Although various systems may have certain advantages over others, most of them have serious drawbacks. Common corrosion protecting systems comprise coating systems, optionally comprising various layers of materials, shrink sleeves, and tapes, optionally provided with adhesive layers, and combinations of such systems.

U.S. Pat. No. 5,817,413 and its Continuation-In-Part U.S. Pat. No. 6,033,776, both of Scapa Tapes North America, for example, disclose a high shear pipeline tape comprising a backing material having on one surface thereof a rubber-based adhesive layer. The rubber-based adhesive layer comprises a rubber mix and a tackifying resin. The rubber mix comprises crosslinked halogenated rubber, non-crosslinked rubber and a styrenic blockpolymer or terpolymer, e.g. a Kraton® polymer. The non-crosslinked rubber is preferably butyl rubber, preferably a mixture of virgin butyl rubber and recycled butyl rubber (butyl rubber is a copolymers of about 98 wt. % isobutene and 2 wt. % isoprene). The tackifying resin is used to provide the desired adhesiveness to the rubber mix and may be selected from a very large group of materials, e.g. rosins, modified rosins, rosin esters, polymerised petroleum hydrocarbons, polymerised terpenes and various resins. Examples 1 and 2 disclose formulations comprising different tackifiers, e.g. Endex® 155 (an aromatic hydrocarbon resin available from Eastman Chemical Company, Indopol® H-100 (an isobutene/1-butene copolymer having a number average molecular weight of about 910, formally available from British Petroleum Chemicals, but currently available from e.g. Amoco Chemical Company and Innovene), Escorez® 1102 (an aliphatic hydrocarbon resin having an average molecular weight of about 1300, available from ExxonMobil), and Piccopale® 100 (a polyterpene resin). Escorez® 1102 is made by polymerising petroleum fractions having a boiling point from about 15° C. to about 410° C. at atmospheric pressure which are formed by the thermal cracking of petroleum feedstock. The fractions may be polymerised thermally or in the presence of a catalyst, for example a Friedel-Crafts catalyst such as AlCl$_3$. Usually the petroleum feedstock, e.g. light naphtha, heavy naphtha, kerosene, gas oil, vacuum gas oil and comprising C$_5$ olefins and diolefins, C$_6$ olefins and diolefins or a mixture of C$_5$ and C$_6$ olefines and diolefins, is cracked in the presence of steam. The products from this cracking process usually have a boiling point of −15° C. to 280° C. and may comprise about 30 to 60% olefins, 10 to 30% diolefins, 20 to 50% aromatics and 5 to 20% paraffins and naphthalenes. Preferably the product is subjected to fractionation to remove C$_2$ to C$_4$ light ends, thermal soaking and distillation to remove hydrocarbons such as cyclic diolefins including cyclopentadiene and methyl cyclopentadiene as dimers (cf. U.S. Pat. No. 4,690,958). Consequently, Escorez ® 1102 and 1315 (see below) are not isobutene based polymers. The high shear tape according to U.S. Pat. Nos. 5,817,413 and 6,033,776 is suitable as a pipe wrap system, provided that the pipe is coated with a primer. Example 3 discloses the use of Escorez® 1315, a hydrocarbon resin having a number average molecular weight of about 950. However, this high shear pipeline tape has a number of disadvantages. First of all, it is required that a bare metal pipe if first coated with a liquid primer, preferably comprising a rubber and a tackifying resin. Secondly, the rubber-based adhesive layer of the tape comprises significant amounts of crosslinked material which is known to be detrimental for the self-healing properties of the rubber-based adhesive layer.

WO 00/52381 of Raychem Ltd. discloses a further shrink sleeve for sealing a welding joint of insulated pipes, wherein between the end portions of the sleeve and the edges of the insulation a sealant or an adhesive is applied. The adhesive may be a polyamide based hot melt adhesive formulation. The sealant is preferably a blend of atactic polypropylene and polyisobutene, optionally with a tackfier, although other products are expressly said to be acceptable as well (cf. page 5, lines 15-17). The nature of the atactic polypropylene and the polyisobutene and their ratio is not disclosed.

CA A 2.308.802 of Shaw Industries, Ltd., discloses a heat-shrinkable polyolefin shrink sleeve that can be applied on the bare welding joints of polypropylene coated pipelines. Polypropylene coatings which usually consist of a combination of epoxy/adhesive/polypropylene, are used for high temperature pipelines. For applying such a heat-shrinkable polyolefin shrink sleeve to the welding joints of the polypropylene coated pipes, an adhesive is necessary to bond the end edges of the shrink sleeve to the end edges of the propylene coatings to ensure a proper seal. However, common high strength adhesives used for this purpose suffer from the disadvantage that they usually bond well to the polyolefin shrink sleeve, but not to the propylene coating. On the other hand, other adhesives that do bond well to the polyolefin shrink sleeve as well as to the polypropylene coating, i.e. low strength mastic compositions, suffer from the disadvantage that they have insufficient shear resistance, in particular at elevated temperatures. CA A 2.308.802 therefore proposes to employ a two-component system for applying a heat-shrinkable polyolefin shrink sleeve to polypropylene coated pipelines. This two-component system comprises a functional coating (indicated by the reference number 21) and a bonding agent (indicated by the reference numbers 22 and 23). The functional coating adheres very well to the bare surface of the joint of the steel pipeline, but does not adhere to the polypropylene coating. On the other hand, the bonding agent, which is applied between the edges of the functional coating and the propylene coating as can be seen in e.g. FIG. 2, adheres well to both coatings and provides a, although weak, water-resistant bond between the shrink sleeve and the polypropylene coating. The functional coating may be a mastic composition, a hot melt adhesive or a hybrid thereof, whereas the bonding agent is preferably a mastic composition. The mastic composition may comprise amorphous material or synthetic polymers or mixtures thereof. Examples of typical mastic compositions that are disclosed in CA A 2.308.802 are blends of substantially amorphous materials, e.g. butyl rubber, natural rubber and latex SBR rubber, and tackifying resins, e.g. synthetic hydrocarbon tackifying resins, rosin ester tackifying resins and inert fillers such as calcium carbonate, talc and carbon black. These mastic compositions may further comprise other amorphous materials or synthetic polymers, e.g. asphalt, polybutene and amorphous polyolefins, e.g. amorphous polypropylene, styrene-isoprene copolymers and liquid butyl polymers. Obviously, the protective system disclosed in CA A 2.308.802 is highly complex and requires many different types of materials. Moreover, shrink sleeves in general suffer from the disadvantage that they do not have self-healing properties.

U.S. Pat. No. 6,355,318 of Shawcor Ltd. also discloses a shrink sleeve based system for protecting welding joints of pre-isolated pipes. In the field, pre-isolated pipes are connected by welding the service pipe that extends beyond the insulation material, where after the welded joint is insulated encased by a shrink sleeve. An important requirement of such a shrink sleeve as already explained above is that it provides a water-tight connection and mechanical protection to the insulation and therefore should adhere very well to the insulation as well as to the pipe. To that end, an adhesive composition is applied between the edges of the insulation material and of the shrink sleeve. The nature of the adhesive composition is irrelevant since it may be selected from a wide range of materials, e.g. a sealant, a mastic or an hot melt adhesive. Obviously, this system suffers from the same disadvantages as the system disclosed in CA A 2.308.802.

U.S. Pat. No. 6,589,346 of Bredero-Shaw Company discusses the technical problems encountered with protecting steel pipes and tubing for underground installation against corrosion. The usual method involves sandblasting the surface of the steel pipe, coating said surface with an epoxy coating and covering it with a polyolefin jacketing material like HDPE or PP. In particular with small diameter pipes, it is difficult to provide a uniform coating of the epoxy coating. Secondly, using a tape as jacketing material, wherein the tape is spirally wound around the pipes, provides weak joints at the area of overlap and poor coverage of radial or longitudinal welding joints. Furthermore, spirally wrapped jacketing material is said to cause poor low temperature adhesion of the epoxy coating to the pipe.

U.S. Pat. Nos. 6,465,547, 6,569,915 and 6,794,453, all of Shawcor Ltd., disclose coating or insulating crosslinked polypropylene compositions. U.S. Pat. No. 6,465,547 expressly discloses in column 1, lines 50-54, that polymers in which the predominant chain units comprise propylene or a higher olefin such as butene tend to depolymerise when exposed to free radicals to effect crosslinking. These patents are typically directed to crosslinked materials and heat-shrinkable articles made thereof.

Another shrink sleeve system is disclosed in US 2004/0028862 to Burwell et al. In particular, this patent application is directed to joining and sealing overlapping edges of heat shrinkable polymeric wrap-around sleeves. Such sleeves comprise an outer layer of heat shrinkable polyolefin material and an inner layer of an adhesive, which adheres the sleeve to the substrate. The sleeve is wrapped around the welding joint of a pipeline, subsequently heated to cause shrinkage of the sleeve. Prior to the heat shrinking step, the overlapping edges of the sleeve are covered by a patch to prevent slippage of the overlapping ends during heat shrinking and subsequent creeping of the overlap joint. The invention disclosed in US 2004/0028862 is a patch comprising a dimensionally stable heat resistant fibrous backing layer and a layer of a high shear strength pressure sensitive adhesive which comprises a layer selected from the group consisting of isobutene polymers such as polyisobutene, polybutene and butyl rubber (butyl rubber is an elastomeric polymer based on about 98% isobutene and 2% isoprene and can easily be crosslinked as is well known in the art). It is expressly said that it is preferred that these materials are at least partially crosslinked to increase shear strength. Other preferred adhesive materials are silicones. Additionally, the nature or the properties of the polyisobutene are not disclosed.

US 2004/0191515 to Mullen, discloses an improved pipe coating for in particular subsea pipelines for the transportation of crude oil. Usually, such coatings consist of a protective epoxy-based protective coating that is applied on the steel pipe which is then covered with a marine concrete layer. The improved coating comprises a layer of polypropylene or polyethylene copolymer mixed with a polypropylene or polyethylene sintered material which is applied between the epoxy-based protective coating and the marine concrete layer to enhance shear resistance of the coating system.

Commercial processes to produce pre-coated steel pipes are very complex and are environmentally unfriendly. First of all, the surface of the steel pipes must be thoroughly cleaned by sandblasting and treatment with acids such as phosphoric acid and chromate. The steel pipe is then heated to a particular material. Subsequently, a primer is applied, usually an epoxy coating. Further layers to improve the protection can be applied, e.g. polyolefin coatings or layers having at least one surface thereof coated with an adhesive composition.

Other corrosion protective systems are based on compositions comprising non-crosslinked material. For example, U.S. Pat. No. 5,898,044 and US 2006175578 of Frans Nooren Afdichtingssystemen B. V. disclose a composition comprising an apolar, non-setting fluid polymer having a glass transition temperature lower than −60° C., wherein the polymer has a surface tension of less than 40 mN/m above the glass transition temperature and one or more fillers.

The corrosion protective coating systems disclosed in the prior art are in particular hampered by the fact that many materials are used or even have to be used that lack a good compatibility. Often, adhesive systems must be used that adhere very well to some materials, but not to others, with the consequence that even different adhesive systems must be used within the same corrosion protective coating system. There is therefore a need in the art for an adhesive composition that is widely applicable and has an excellent compatibility with the common materials used in corrosion protective coating systems and with the materials used for the construction of the pipes, pipelines and the like, e.g. steel, metal and concrete.

SUMMARY OF THE INVENTION

The present invention provides an adhesive composition based on one or more particular polyisobutenes. This adhesive composition has an excellent compatibility with materials used in corrosion protections, e.g. shrink sleeves and shrink patches made of polyolefins and polymeric compositions comprising non-crosslinked polymers and fillers. The present invention therefore relates to a process for providing an extended tubular article or one or more sections of the extended tubular article with a corrosion protecting system, wherein (a) a layer of an adhesive composition is applied to the surface of the extended tubular article or the one or more sections of the extended tubular article, and (b) a corrosion protecting layer is applied to the layer of the adhesive composition, the adhesive composition comprising a polyolefin blend, wherein the polyolefin blend comprises 30% to 100% by weight of a polyisobutene and 0% to 70% by weight of an olefin polymer, based on the total weight of the polyolefin blend, wherein said polyisobutene is characterised by:

(A) a glass transition temperature of lower than −40° C.; and (B) a number average molecular weight $M_n$ of 1300 to 1.000.000.

DETAILED DESCRIPTION OF THE INVENTION

In this description and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there is one and only one of the elements. The indefinite article "a" or "an" thus usually means "at least one".

Polyisobutene

The adhesive composition comprises a single polyisobutene or a blend of different polyisobutenes. The glass transition temperature or glass transition temperatures of the polyisobutenes are preferably lower than −50° C. and more preferably lower than −60° C. The glass transition temperature or glass transition temperatures can be determined by differential scanning caloriemetry (DSC) as is well known in the art, The number average molecular weight $M_n$ is preferably within the range of 5.000 to 1.000.000, more preferably within the range of 10.000 to 1.000.000 and in particular within the range of 10.000 to 900.000. The molecular weight distribution $M_w/M_n$ of the polyisobutenes is preferably between 1 to 10, more preferably 1 to 5, even more preferably 1 to 4 and most preferably 1.5 to 3.5.

The number average molecular weight $M_n$ of the polyisobutenes is determined by GPC for the lower molecular weights, e.g. up to about 100.000. For the higher number average molecular weights, they are determined by viscosity measurements (Staudinger Index $J_o$, formerly known as intrinsic viscosity), wherein the Staudinger Index is calculated from the flow time at 20° C. through capillary 1 of an Ubbelohde viscometer using the following formulas:

$$J_o = \eta_{sp}/c(1+0.31\times\eta_{sp})[cm^3/g]$$

$$\eta_{sp}=(t/t_o)-1$$

wherein t is the flow time of the solution, with Hagenbach-Couette correction, $t_o$ is the flow time of the solvent (e.g. isooctane), with Hagenbach-Couette correction, and c is the concentration if the solution in g/cm³. The number average molecular weight $M_n$ is then calculated as follows:

$$M_n = 0.94 \times \sqrt{\frac{1000 \times J_0}{2.27}}$$

The polyisobutenes to be used in the adhesive composition according to the present invention preferably have a Staudinger Index $J_o$ of 10 to 1500 cm³/g, preferably of 20 to 1000 cm³/g, as determined at 20° C.

The polyisobutenes have further preferably a surface tension of less than 40 mN/m at 20° C. The density of the polyisobutenes is preferably between 0.90 to 0.95 g/cm³.

The polyisobutenes may be prepared in various ways. Polymerisation may be conducted in single stage processes or in multi stage processes. It is preferred that the polymerisation is conducted in the liquid phase using a Lewis acid as catalyst, preferably boron trifluoride complex catalyst, optionally in the presence of a cocatalyst. Such processes are well known in the art.

Preferred polyisobutenes are from the Oppanol series, in particular from the Oppanol B type.

Olefin Polymer

According to the present invention, the olefin polymer is preferably selected from the group consisting of (a) a polymer comprising 50.0% to 99.9% by weight of isobutene and 0.1% to 50.0% of an optionally substituted, linear or branched $C_2$-$C_{12}$ alkene or an optionally substituted, linear or branched $C_2$-$C_{12}$ alkadiene, based on the total weight of the polymer, (b) a polymer comprising 50.0% to 99.9% by weight of propene and 0.1% to 50.0% of a an optionally substituted, linear or branched $C_2$-$C_{12}$ alkene, based on the total weight of the polymer, (c) a polymer comprising 0.1% to 50.0% by weight of ethene and 50.0% to 99.9% of an optionally substituted, linear or branched $C_2$-$C_{12}$ alkene, based on the total weight of the polymer, (d) a polymer comprising 0.1% to 50.0% by weight of 2-methyl-1-pentene and 50.0% to 99.9% of an optionally substituted, linear or branched $C_2$-$C_{12}$ alkene, based on the total weight of the polymer, and mixtures thereof. Preferably, the olefin polymer is uncrosslinked. Examples of olefin polymers according to class (a) include polybutenes manufactured from a butene feed (such feeds comprise 1-butene and isobutene or 1-butene and small amounts of ethene, propene or other $C_4$-$C_6$ α-olefins), butyl rubbers (copolymers of about 98 wt. % isobutene and 2 wt. % isoprene), halogenated butyl rubbers, copolymers of isobutene and butadiene and the like. Examples of the olefin polymers according to class (b) include atactic polypropenes, ethene/propene copolymers, in particular those having a high propene content and ethene/propene/diene copolymers. Examples of the olefin polymers according to class (c) include ethene copolymers having as a comonomer e.g. propene, 1-hexene, 1-octene and 1-decene. An example of the olefin polymer of class (d) includes poly(2-methyl-1pentene).

Most preferably, the olefin polymer is selected from the group consisting of polybutene, butyl rubber, atactic polypropylene, poly(2-methyl-1-pentene) and mixtures thereof.

The polybutene has preferably a melt index of 0.2-300 g/min (ISO 1133; 190° C., 2.16 kg), a density of 0.90-0.95 g/cm³ (ISO 1183) and a melting point of 80°-130° C. according to DSC.

The butyl rubber ahs preferably a Mooney viscosity ML 1+8 (ASTM D 1646; 125° C.) of 25 to 75 and a level of unsaturation of 1.0 to 3.0 mol %.

The poly(2-methyl-1-pentene) has preferably a melt index of 1-250 g/min (ASTM D 1236, 260° C., 5 kg), a softening point of 160°-200° C. (Vicat, ASTM D 1525) and a density of 0.82-0.85 g/cm³ at 25° C.

The atactic polypropylene has preferably a number average molecular weight of 1.000-3.000 and a weight average molecular weight of 100.000-200,000. In the atactic polypropylene, the amount of $C_2$-$C_{10}$ α-olefin is up to about 20 percent by weight, and is preferably between about 2 and about 10 percent by weight.

According to the invention, it is preferred that the olefin polymer has a glass transition temperature of less then −20°

C., more preferably less than −40° and most preferably less than −60° C. Additionally, it is preferred that the olefin polymer has a surface tension of less than 40 mN/m at 20° C.

Adhesive Composition

The adhesive composition preferably comprises 50% to 100% by weight of a polyisobutene and 0% to 50% by weight of the olefin polymer, based on the total weight of the polyolefin blend. More preferably, The adhesive composition comprises 75% to 100% by weight of a polyisobutene and 0% to 25% by weight of the olefin polymer, based on the total weight of the polyolefin blend. Even more preferably, the adhesive composition preferably comprises 90% to 100% by weight of a polyisobutene and 0% to 10% of the olefin polymer, based on the total weight of the polyolefin blend. Most preferably, the adhesive composition comprises 100% by weight of a polyisobutene and no olefin polymer.

According to the invention, a layer of the adhesive composition according to the present invention is applied to the surface of the extended tubular article or the one or more sections of the extended tubular article with a thickness of 0.01 mm to 50 mm, preferable 0.1 mm to 25 mm.

Applications

Pre-coated Pipes

An important advantage of the adhesive composition according to the present invention is that the surface of the extended tubular articles does not need any pre-treatment, e.g. sandblasting or treatments with hazardous and environmentally unfriendly chemicals such as phosphoric acid and chromate. However, some pre-treatments may enhance the adhesive properties of the adhesive composition. For instance, the extended tubular article may comprise a base layer of a pre-coat, e.g. a pre-coat based on an epoxy resin. In another embodiment of the present invention, the extended tubular article may have as base layer a polyolefin layer. Consequently, one application of the adhesive composition is the use thereof in a process for manufacturing pre-coated steel pipes wherein the pipes are provided with a pre-coating, preferably a polyolefin coating, preferably a polyethene or a polypropene coating.

Corrosion Protection

The applications of the adhesive composition is in particular in the field of corrosion protection. Consequently, according to the invention, the extended tubular article is therefore a pipe or a pipe line or a section thereof, in particular joints. Furthermore, it is preferred that the pipe or pipe line is essentially made of steel or concrete, most preferably of steel.

The adhesive composition according to the present invention is compatible with and adheres extremely well to materials commonly used in corrosion protective systems. Even compositions such as disclosed in U.S. Pat. No. 5,898,044 and US 2006175578 of Frans Nooren Afdichtingssystemen B. V. appear to have a better adhesion to the object to be protected. Hence, another application of the adhesive composition according to the present invention is the use thereof in a method for protecting a shaped article, preferably an oil or gas line or pipe, against corrosion, wherein in a first step a first layer of the adhesive composition according to the present invention is applied to the surface of the shaped article and wherein in a second step a second layer of a corrosion protective composition is applied to the layer of the adhesive composition according to the present invention, wherein the composition comprises:

(a) a polyisobutene having a glass transition temperature of less than −20° C. and surface tension of less than 40 mM/m at a temperature above the glass transition temperature of said polyisobutene, (b) a filler material, and (c) an anti-oxidant, wherein said anti-oxidant is selected from the group consisting of a primary and a secondary anti-oxidant.

In this embodiment of the invention, it is preferred that the filler material comprises an inorganic material such as inorganic minerals, salts and oxides, e.g. chalk, boron sulphate, aluminium oxide, silicon dioxide, limestone, ground quartz, glass, talc, slate, bentonite and the like. It is also preferred that the filler material has a density of about 2.0 to about 4.0 $kg/dm^3$, preferably about 1.5 to about 3.5 $kg/dm^3$, at 20° C. according to DIN ISO 787/10. It is furthermore preferred that the filler material consists essentially of an inorganic material, preferably at least 75 wt. %, more preferably at least 90 wt. % and most preferably at least 95 wt. %, based on the total weight of the filler material. It is furthermore preferred that the filler material has a very low water solubility, preferably of less than 0.1 g/l (20° C.; according to DIN ISO 787/8), more preferably less than 0.05 g/l. According to a particular embodiment of the present invention, the filler material consists essentially of calcium carbonate and a very suitable commercially available material is Omyalite 95T (available from Omya GmbH, Köln, Germany). The composition used for the second layer preferably comprises about 40 wt. % to about 80 wt. % of the filler material, preferably about 50 wt. % to about 70 wt. %, calculated on the total weight of the corrosion protecting system.

In addition, according to this embodiment of the invention, it is furthermore preferred that the primary anti-oxidant is selected from the group consisting of sterically hindered phenol compounds. More preferably, the anti-oxidant is an anti-oxidant composition comprising at least two anti-oxidants, wherein it is preferred that the anti-oxidant composition comprises a primary anti-oxidant and a secondary anti-oxidant. Additionally, the sterically hindered phenol compound preferably comprises at least two sterically hindered phenol groups. Furthermore, the secondary anti-oxidant is selected from the group consisting of fosfites and thioesters. The anti-oxidant composition further comprises a lactone. Such anti-oxidants are extensively disclosed in WO 2005/005528 which for that reason is expressly incorporated by reference.

Preferably, the second layer of the corrosion protective composition comprising at least one polyisobutene, filler and anti-oxidant is provided with a third layer, said third layer being a film comprising an olefinic polymer or copolymer. Alternatively, the first layer may me provided with a top layer formed by a wrapping tape, said wrapping tape comprising a first layer comprising the film comprising the olefinic polymer or copolymer and a second layer comprising the composition comprising at least one polyisobutene, filler and anti-oxidant and having a total thickness of about 1.0 to about 3.0 cm, more preferably about 1.2 to about 2.8 cm. However, it is also within the scope of this invention that the second layer of the composition comprising at least one polyisobutene, filler and anti-oxidant is enclosed by a shrink sleeve or wrap-around sleeve or sheet which are well known in the art.

According to another preferred embodiment of the invention, extended tubular articles or sections thereof, e.g. a pipe or a pipe line or a section thereof, that are connected to each other by connecting means or structures such as joints and flanges, wherein these connecting means or structures and the extended tubular articles do not have a gradual transition, a non-hardening composition consisting essentially of the polyisobutene and the filler material described above is preferably used to create a gradual transition. The advantage of applying such a non-hardening composition is that the combination of the corrosive protecting composition described above and the third layer, e.g. the film or the wrapping tape, can more easily be wrapped around the transition of extended tubular article and connecting means or structure. This non-hardening composition contains essentially about 90-99% by weight of the polyisobutene and 1-10% by weight of the filler material. This non-hardening composition may be applied below to the first layer of the adhesive composition, between said first layer of the adhesive composition and the second layer of the corrosive protective composition or between said second layer of the corrosive protective composition and the third layer of the corrosion protecting layer disclosed below.

Corrosion Protecting Layer

According to a preferred embodiment of the present invention, the corrosion protecting layer which is applied to the surface of the adhesive composition comprises a polyolefin material, preferably a homopolymer or a copolymer of an optionally substituted, linear or branched $C_2$-$C_{12}$ alkene. In addition, it is preferred that the corrosion protecting layer according to this invention is heat shrinkable. More preferably, this corrosion protecting layer comprises a shrink sleeve or a wrap-around sleeve or sheet as is disclosed above.

According to another preferred embodiment of the present invention, the corrosion protecting layer comprises the composition disclosed above which comprises a polyisobutene having a glass transition temperature of less than −20° C. and surface tension of less than 40 mM/m at a temperature above the glass transition temperature of said polyisobutene; a filler material; and an anti-oxidant, wherein said anti-oxidant is selected from the group consisting of a primary and a secondary anti-oxidant.

Accordingly, the adhesive composition according to the present invention is in particular useful in the following methods for providing corrosion protection.

A high shear adhesive tape comprising a backing material may carry on the surface thereof a layer of the adhesive composition according to the present invention, wherein the backing material comprises an impact resistant polymeric material that is preferably made of a polyolefin. The high shear adhesive tape can be wound around an extended tubular article or a part thereof, e.g. a welded joint. The backing material of the high shear adhesive tape preferably comprises an impact resistant polymeric material. The high shear adhesive tape has preferably a totals thickness of 5-30 mils.

Another application concern pipes or pipelines provided with a propylene covering. For example, a layer of the adhesive composition according to the present invention may be applied to (a part of) the propylene covering to bond a second covering, in particular where heat shrinkable sleeves are to be provided onto such propylene coverings as is disclosed in e.g. CA A 2.308.802.

Likewise, the adhesive composition according to the present invention may be used in a method for forming a composite sleeve having heat shrinkable end portions, wherein an inner covering member is disposed on a mandrel and a sleeve is disposed around the inner member and the mandrel, wherein the sleeve extends beyond both ends of the inner member. The sleeve is manufactured from a heat shrinkable sheet having end portions which are to be bonded together at an overlapping portion. Subsequently, the sleeve is heat shrunk so that the sleeve is bonded to the inner member to form the composite sleeve. Additionally, where a sleeve is used to connect two pre-insulated pipe sections, the adhesive composition according to the present invention may be applied to the edges of the insulation and/or to the edges of the sleeve to ensure not only a good bond between the two, but also a water tight seal.

Furthermore, the adhesive composition according to the present invention may be used to apply a closure comprising a heat resistant backing layer, wherein to a surface of the backing layer a layer of the adhesive composition is applied, to a heat shrinkable wrap around sleeve. The closure is applied to the overlapping sections of the wrap around sleeve prior to heat shrinking to prevent slippage of the overlapping sections during heat shrinking and to prevent subsequent creeping of the overlap joint.

The adhesive composition according to the present invention may also be used to improve the bonding between epoxy base layers provided on pipes and pipelines and outer coatings, e.g. marine concrete.

Adhesive Composition Comprising Filler Material

The adhesive composition according to the present invention may also comprise a filler material, which is preferably an active reinforcing filler, preferably a fumed silica, e.g. AEROSIL® available from Degussa. According to this embodiment, the adhesive composition comprises about 1 to about 10 percent by weight of the filler material, based on the total weight of the adhesive composition. An advantage of using a fumed silica is that the adhesive composition keeps its translucency thereby enabling visible inspection of the surface of the extended tubular article after application of the adhesive composition.

The invention claimed is:

1. A process for improving the adhesion between an extended tubular article or a section thereof and a corrosion protecting system, the process comprising:
   (a) applying a layer of an adhesive composition to a surface of the extended tubular article or a section thereof; and, subsequently,
   (b) applying a corrosion protecting layer to the layer of the adhesive composition,
   wherein the adhesive composition comprises a polyolefin blend, wherein the polyolefin blend comprises 30% to 100% by weight of a polyisobutene and 0% to 70% by weight of one or more olefin polymers, based on the total weight of the polyolefin blend, wherein the polyisobutene has the following properties (i) to (v):
      (i) a glass transition temperature of lower than −40° C.;
      (ii) a number average molecular weight $M_n$ of 1,300 to 1,000,000;
      (iii) a molecular weight distribution $M_w/M_n$ of between 1 to 10;
      (iv) a surface tension of less than 40 mN/m at 20° C.; and
      (v) a density between 0.90 to 0.95 g/cm$^3$;
   wherein the corrosion protecting layer comprises a polyisobutene and 40 to 80% by weight of a filler material, based on the total weight of the corrosion protecting layer; and
   wherein the adhesive composition either comprises 1 to 10% by weight of a filler, based on the total weight of the adhesive composition, or consists of the polyolefin blend.

2. The process according to claim 1, wherein the polyisobutene has a number average molecular weight $M_n$ of 5,000 to 1,000,000.

3. The process according to claim 2, wherein the polyisobutene has a number average molecular weight $M_n$ of 10,000 to 1,000,000.

4. The process according to claim 1, wherein the polyisobutene has a Staudinger Index $J_o$ of 10 to 1,500 cm3/g as determined at 20° C.

5. The process according to claim 4, wherein the polyisobutene has a Staudinger Index $J_o$ of 20 to 1,000 cm3/g as determined at 20° C.

6. The process according to claim 1, wherein the olefin polymer has a glass transition temperature of lower than −20° C.

7. The process according to claim 6, wherein the olefin polymer is selected from the group consisting of:
(a) a polymer comprising 50.0% to 99.9% by weight of isobutene and 0.1% to 50.0% of an optionally substituted, linear or branched $C_2$-$C_{12}$ alkene or an optionally substituted, linear or branched $C_2$-$C_{12}$ alkadiene, based on the total weight of the polymer;
(b) a polymer comprising 50.0% to 99.9% by weight of propene and 0.1% to 50.0% of a an optionally substituted, linear or branched $C_2$-$C_{12}$ alkene, based on the total weight of the polymer;
(c) a polymer comprising 0.1% to 50.0% by weight of ethene and 50.0% to 99.9% of an optionally substituted, linear or branched $C_2$-$C_{12}$ alkene, based on the total weight of the polymer;
(d) a polymer comprising 0.1% to 50.0% by weight of 2-methyl-1-pentene and 50.0% to 99.9% of an optionally substituted, linear or branched $C_2$-$C_{12}$ alkene, based on the total weight of the polymer; and
(e) mixtures thereof.

8. The process according to claim 7, wherein the olefin polymer is polybutene having a melt index of 0.2 to 300 g/min, a density of 0.90 to 0.95 g/cm$^3$, and a melting point of 80° to 130° C.

9. The process according to claim 7, wherein the olefin polymer is butyl rubber having a Mooney viscosity ML 1+8 of 25 to 75 and a level of unsaturation of 1.0 to 3.0 mol %.

10. The process according to claim 7, wherein the olefin polymer is atactic polypropylene having a number average molecular weight $M_n$ of 1,000 to 3,000 and a weight average molecular weight $M_w$ of 100,000 to 200,000.

11. The process according to claim 7, wherein the olefin polymer is poly(2-methyl-1-pentene), optionally having a melt index of 1 to 250 g/min, a softening point of 160° to 200° C., and a density of 0.82 to 0.85 g/cm$^3$.

12. The process according to claim 6, wherein the olefin polymer is uncrosslinked.

13. The process according to claim 1, wherein the adhesive composition comprises a filler.

14. The process according to claim 13, wherein the filler is a fumed silica.

15. The process according to claim 13, wherein the adhesive composition comprises 1 to 10% by weight of the filler, based on the total weight of the adhesive composition.

16. The process according to claim 1, wherein the extended tubular article is a pipe or pipeline.

17. The process according to claim 1, wherein the extended tubular article is made of steel, concrete or both.

18. The process according to claim 1, wherein the extended tubular article is pre-coated.

19. The process according to claim 18, wherein the pre-coat comprises an epoxy resin.

20. The process according to claim 1, wherein the extended tubular article is provided with a base layer.

21. The process according to claim 20, wherein the base layer comprises a homopolymer or a copolymer of an optionally substituted, linear or branched $C_2$-$C_{12}$ alkene.

22. The process according to claim 1, wherein the corrosion protecting layer is heat shrinkable.

23. The process according to claim 22, wherein the corrosion protecting layer comprises a shrink sleeve or a wrap-around sleeve or sheet.

24. The process according to claim 1, wherein the corrosion protecting layer comprises a polyisobutene having a glass transition temperature of less than −20° C. and surface tension of less than 40 mM/m at 20° C. and a filler material.

25. The process according to claim 24, wherein a film layer is applied to the corrosion protecting layer.

26. The process according to claim 25, wherein the film layer comprises an olefinic polymer or copolymer.

27. The process according to claim 24, wherein the corrosion protecting layer comprises a wrapping tape.

28. The process according to claim 27, wherein the wrapping tape comprises a first layer comprising a film and a second layer comprising a composition comprising a polyisobutene having a glass transition temperature of less than −20° C. and surface tension of less than 40 mM/m at 20° C. and a filler material.

29. The process according to claim 28, wherein the film comprises an olefinic polymer or copolymer.

* * * * *